Patented Sept. 27, 1938

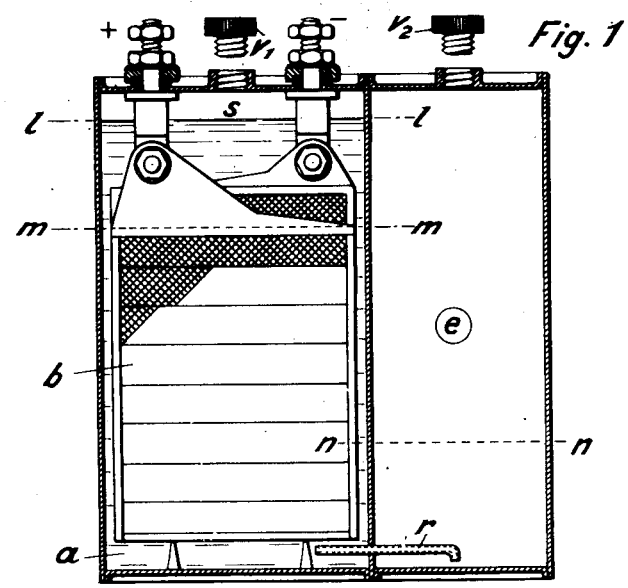
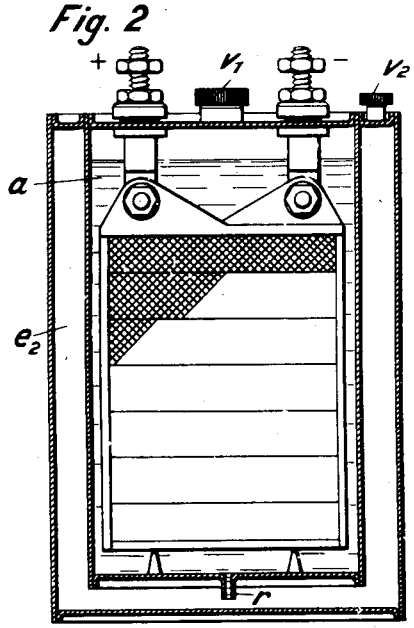
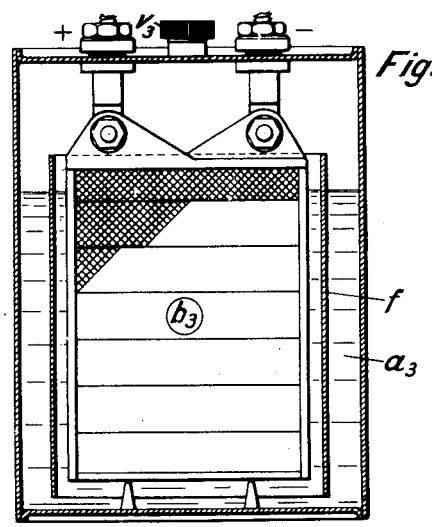

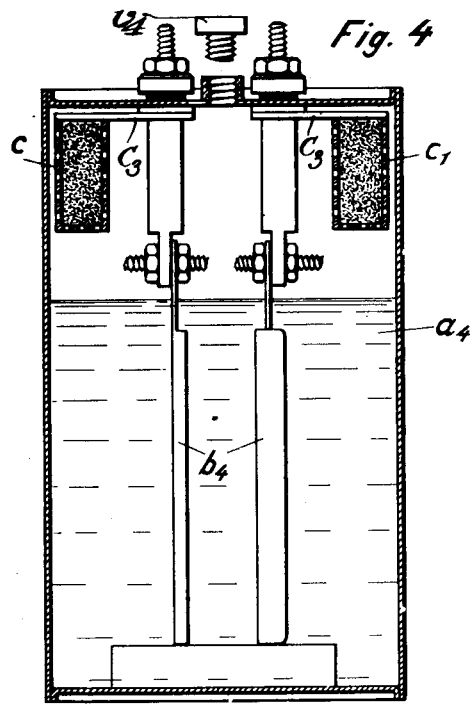
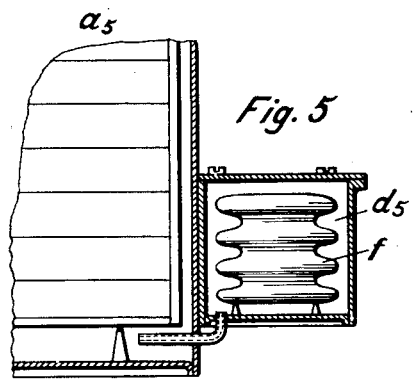
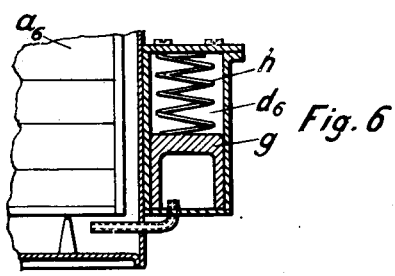
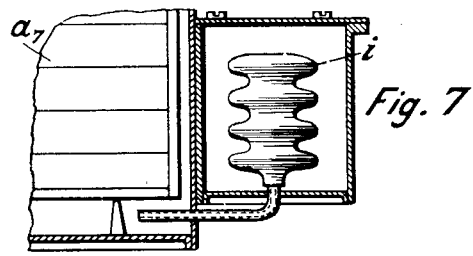
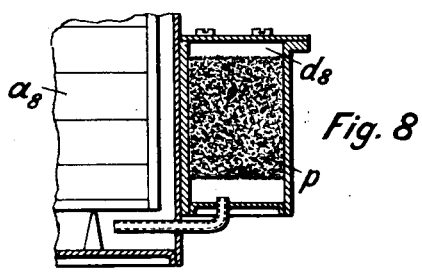

2,131,592

UNITED STATES PATENT OFFICE 2,131,592

ELECTRIC BATTERY, PARTICULARLY SECONDARY BATTERY, AND METHOD OF OPERATING THE SAME

Alfons Erich Lange, Hagen, and Erich Langguth, Hagen-Oberdelstern, and Edmund Breuning and Adolf Dassler, Hagen, Germany, assignors to Accumulatoren-Fabrik A.-G., Berlin, Germany, a joint-stock company of Germany Application November 17, 1934, Serial No. 753,462
In Germany November 18, 1933

12 Claims. (Cl. 136—179)

Our invention relates to improvements in electric batteries particularly secondary batteries and the method of operating the same, and more particularly in systems for and the method of removing hydrogen and oxygen developed in the batteries by gassing.

It has heretofore been proposed to remove the hydrogen and oxygen developed in secondary batteries after charging by gassing and to return the same into the electrolyte in the form of water by means of suitable catalysts of the platinum group, such as platinum sponge. Further, in the U. S. Letters Patent No. 2,104,973, granted January 11, 1938, on the application of Adolf Dassler, Galvanic batteries or cells have been described in which the said gases are electro-chemically removed or combined by catalysis by means of gas electrodes.

The object of the improvements is to provide a battery and a method by means of which the gases are removed in such a way that there is no danger of ignition and explosive combination of the gases, and in which the gases may be completely removed even if they are not present in their equi-molecular proportions. Another object of the improvements is to provide a system and a method which are simple in operation, and which do not require large additional surfaces for removing the said gases. With these and other objects in view our invention consists in causing the gases produced after charging the battery and when current is taken therefrom, or when it is on open circuit, to be absorbed by oxidizing and reducing chemically active substances, substantially without ion reaction with the electrolyte, the gases being combined with the said active substances to form chemical compounds other than water.

In carrying out the invention we prefer to cause the gases to be absorbed by and combined with such substances from which the gases may be returned by electrolysis into the initial compounds from which they are developed. Preferably the absorbing substances are provided with catalysts by means of which the absorbed gases are activated, the said catalysts being preferably contained in a state of fine distribution in the chemically active substances, and they may be incorporated in the said substances in the form of solutions.

For the purpose of explaining the invention several examples of batteries embodying the same have been illustrated in the accompanying drawings in which Fig. 1 is a sectional elevation showing a secondary battery, Figs. 2 to 4 are similar sectional elevations showing modifications, and Figs. 5 to 8 are fragmentary sectional elevations showing expansion chambers and compressible bodies permitting the electrolyte to be partly removed from or returned into the chamber containing the electrodes.

Preferably, for absorbing the gases substances are used which are the same as those forming the negative mass or the positive and negative masses of the battery, and to said masses suitable catalysts may be added. By thus absorbing the gases the energy for regenerating the oxidized and reduced substances may be readily supplied when the battery is again charged. Thus the chemical active bodies may be constructed in the form of electrodes and equipped with terminals for supplying current thereto for regenerating the substances. Therefore the active bodies may be constructed in the form of subsidiary electrodes which are adapted to be removed from the electrolyte for acting on the said gases, and immersed into the electrolyte for being regenerated. In a modification the main electrodes of the electric battery are made to act with their top parts as absorption bodies. In any case it is necessary that during gassing and simultaneous absorption the absorption bodies project from the electrolyte. For this purpose a certain amount of the electrolyte may be removed from the battery after charging and returned into the same before charging begins. In a modification oxidation or reduction and regeneration of the absorption bodies may be effected by causing the electrodes and more particularly the portions thereof which form the absorption bodies to project from the electrolyte before charging begins and bringing the electrolyte into contact with the said portions by capillary absorption, so that the said portions are charged together with the main electrodes.

In the process the oxygen is absorbed in a particularly simple way because it oxidizes the moist and highly dispersive substances also in molecular state at comparatively high reaction velocity. Therefore the oxygen which is developed by gassing from the positive plates may be bound by negative electrode plates projecting from the electrolyte, the said plates being in a metallic state. In batteries in which gassing of the negative electrodes is insignificant this expedient may be sufficient to permit the battery to be closed after charging.

The absorption of the gases and the regeneration of the electrodes is carried out as follows:
In an acid storage battery the essential parts of the electrodes are on the one hand spongy lead and on the other hand lead superoxide, and during gassing the spongy lead absorbs oxygen and it is primarily transformed into lead oxide PbO and thereafter it is transformed by reaction with the electrolyte in PbSO$_4$. Further, during gassing the lead superoxide absorbs hydrogen and it is primarily transformed into lead oxide, which is transformed by electrolysis into lead sulfate. In an alkaline secondary battery the negative mass, that is spongy cadmium or iron, which projects from the electrolyte takes up oxygen and is transformed thereby into cadmium or iron oxide or hydroxide. The nickel trioxide Ni$_2$O$_3$, which is the main component of the positive substance takes up hydrogen and water and it is transformed thereby into nickel bihydroxide Ni(OH)$_2$.

In Fig. 1 we have shown a battery, in which the gassing of the negative electrode is insignificant, and in which therefore hydrogen need not be removed. The oxygen is removed by the negative mass of the negative electrode which is made to project from the electrolyte. As shown, the negative electrode is somewhat higher or larger than the positive electrode, and means are provided for lowering the level of the electrolyte. Therefore, when the level of the electrolyte is lowered the active metal is made to project therefrom and to absorb the oxygen, while the positive electrode is not made to project from the electrolyte, or at a later stage.

The battery comprises a container having a main chamber $a$ in which the electrodes $b$ are located and which is adapted to be opened and closed by means of a screw plug $v_1$. Laterally of the main chamber $a$ there is a subsidiary chamber $e$ which is adapted to be opened and closed by means of a screw plug $v_2$. At their bottoms the chambers $a$ and $e$ communicate with each other through a thin horizontal pipe $r$.

At the beginning of the operation the electrolyte is supplied only to the chamber $a$, while the chamber $e$ contains only air or another readily compressible substance such as rubber sponge. The chamber $e$ is closed in an air-tight manner by means of the screw plug $v_2$, and the electrolyte is supplied to the chamber $a$ to the level $l$—$l$ and so far that both electrodes are perfectly immersed. Now the battery is charged and after charging or a suitable time thereafter the chamber $a$ is closed by means of the screw plug $v_1$.

If now the battery is on open circuit or being discharged, and gassing takes place on the positive electrode, which may develop for example oxygen, the said gas is at first collected in the top parts of the chamber $a$, and pressure is produced in the said chamber by which the electrolyte is partly pressed into the chamber $e$, the said chamber acting as an expansion chamber. When the liquid within the chamber $a$ has sunk to the level $m$—$m$ and risen within the chamber $e$ to the level $n$—$n$ indicated in dotted lines, the oxygen within the portion $s$ of the chamber $a$ is absorbed by the negative electrode which now projects into the said portion $s$. Therefore, further sinking of the level of the electrolyte and increase of the pressure within the chamber $a$ does not take place, provided that gassing of the negative electrode is but slight.

If it is desired to recharge the battery the screw plug $v_1$ is removed from the opening of the chamber $a$, whereupon the electrolyte within the said chamber rises to the normal level shown in Fig. 1 in full lines. If now the battery is charged also the top part of the negative electrode is recharged.

If in a battery of the construction shown in Fig. 1 gassing takes place also on the negative electrode developing for example hydrogen, both electrodes, viz. the positive and negative electrodes are made of normal size and so that they have substantially the same height. Therefore, if the level of the electrolyte within the chamber $a$ falls off, both electrodes are made to project into the gas portion $s$ of the chamber $a$, so that they are able to absorb the gases.

If only oxygen is to be absorbed the negative electrode may be used as such. But if also absorption by the positive electrode of the hydrogen is necessary, the top parts of the positive plate must be prepared in a suitable way as will be explained hereinafter.

In Fig. 2 we have shown a modification of the battery which is similar in principle to the construction described with reference to Fig. 1 and the same letters of reference have been used to indicate corresponding parts. As distinguished from the construction shown in Fig. 1 the expansion chamber $e_2$ is located all around the main chamber $a$. In this construction the positive and negative plates are equal in size so that the battery is suitable for absorbing hydrogen as well as oxygen.

In Fig. 3 we have shown a modification in which other means are provided for bringing the electrolyte into contact with the top parts of the electrodes.

The chamber $a_3$ of the battery is adapted to be closed by a screw plug $v_3$. The positive and negative electrodes $b_3$ are equal in size, and they are confined within a jacket $f$ which is open at its top and bottom. If now the battery is charged the gas bubbles rising from the plates and within the jacket $f$ cause the electrolyte to rise within the said jacket by reduction of the specific gravity, so that the electrolyte rises within the jacket to the upper margin of the plates $b_3$. Therefore the absorption bodies of the electrodes are recharged and regenerated. After charging the level of the electrolyte falls off within the jacket $f$, so that the top parts of the plates act as absorption bodies. If necessary the plates are prepared in a suitable way as will be explained hereafter.

In Fig. 4 we have shown a modification in which subsidiary electrodes $c$ and $c_1$ are provided in addition to the main electrodes $b_4$ for removing the hydrogen and oxygen. The said electrodes are carried by arms $c_3$ which are shiftable on the terminals of the electrodes for immersing the same into the electrolyte or retracting the same therefrom. While the battery is being charged it is opened at its top by removing a plug $v_4$, and after charging it is closed by means of the said plug. When now the battery is on open circuit or being discharged gassing takes place, and for absorbing the gases the subsidiary electrodes are located above the level of the electrolyte within the chamber $a_4$, and when the battery is charged it is again opened by removing the plug $v_4$, and the said subsidiary electrodes $c$ and $c_1$ are immersed into the electrolyte, and the charging current is passed through the same, the said subsidiary electrodes being connected to the source of electric energy. Thus the subsidiary electrodes are regenerated.

In Fig. 5 we have shown a modification of the expansion chamber. As shown the receptacle $a_5$ is connected below the surface of the electrolyte, with a chamber $d_4$ in which a compressible and expansible metal box $f$ is located. When gas rises within the receptacle $a_4$ part of the electrolyte is forced into the chamber $d_4$ thus compressing the box $f$, and after the gas within the chamber $a_4$ is absorbed by the electrode or electrodes in the manner described above and the pressure reduced accordingly, the box $f$ is again expanded by spring action.

In Fig. 6 we have shown another modification in which the chamber $d_4$ connected with the chamber $d_4$ takes the form of a cylinder having a piston $g$ slidable therein, the said piston being acted upon by a spring $h$ tending to force the same inwardly. If now the pressure within the chamber $a_4$ rises by gas being developed therein, the piston $g$ is forced outwardly against the action of the spring $h$, and if the gases are again absorbed the spring $h$ forces the piston $g$ inwardly, so that the electrolyte is returned into the chamber $a_4$.

In the modification shown in Fig. 7 an expansible and compressible ball $i$ of caoutchouc is connected to the container $a_7$, the said ball being expanded by elasticity and compressed as the pressure within the chamber $a_7$ varies.

In the modification shown in Fig. 8 a chamber $d_4$ connected with the container $a_4$ includes a body of rubber sponge $p$ which is compressed and expanded in a similar way as the box $f$ described with reference to Fig. 5.

In alkaline batteries the absorption electrodes having suitable catalysts added thereto may be produced by finely dividing the said catalysts within the active mass, or by pressing thin bodies of the active mass into platinized pockets or pockets having a coating of palladium, or by impregnating the pockets which have been filled with active mass with solutions of the catalysts and causing the metal to be deposited on the pocket as well as on the active mass. In Fig. 4 the subsidiary electrodes $c$ and $c_1$ comprise such pockets which are coated with platinum or palladium.

As a catalyst for the negative subsidiary electrode platinum has been found to be particularly suitable, while as a catalyst for the positive subsidiary electrode palladium is very effective. In many cases and particularly in alkaline batteries it is preferable to activate only the active mass which is to be brought above the level of the electrolyte. For this purpose the said mass may be brought into direct contact with the catalyst such as a metal of the platinum group. We have found that exceedingly slight amounts of such catalysts are sufficient for activating the electro-chemical metal of the negative mass by means of which the gaseous oxygen is activated. Such an electrode is also adapted to burn oxyhydrogen gas. Therefore, by the said electrode also the hydrogen is bound, as far as the oxygen is in excess.

If the metal of the mass is highly electro-negative the activating catalyst added thereto may excite oxidation of the said metal by the electrolyte. In this case the metal combined with the catalyst should not be the same as that forming the mass of the active electrode of the battery, but it must be a metal which is less electro-negative. Therefore, the plate of the battery is composed of two parts, an upper part which projects from the liquid and comprises a metal which is in a higher degree electro-positive, and a lower part which is in a lower degree electro-positive. Thus, in alkaline batteries the main electrode of which consists of a mass containing iron should, preferably, contain, in its top part, a mass of cadmium which is poor in or free from iron.

For absorbing the hydrogen the active positive electrode extending into the gas chamber and having no addition of a catalyst is not sufficient, because at ordinary temperature the molecular hydrogen does not directly permit reduction, so that it is not directly bound by the higher oxygen compounds.

If, however, catalysts of the same character (platinum or palladium) are added to the positive mass, as has been described above, the said addition permits binding of the hydrogen.

In order that the undesirable accumulation of gas be prevented the said absorption bodies must extend into the gas chamber and, further, they must be regenerated when the battery is recharged. This is accomplished in a reliable and simple way by displacing the level of the electrolyte, for example, in the manner described with reference to the figures, by the hydro-dynamic or aero-dynamic forces produced in the operation of the battery or while it is on open circuit, which forces displace the level of the electrolyte in such a way that the active bodies, which have respectively oxidizing and reducing properties, get into contact during charging with the electrolyte, because when the battery is open and therefore the level of the electrolyte rises above the plates, and when the battery is in operation or on open circuit the said active bodies get into contact with the gases because now the electrolyte is partly expelled from the chamber containing the electrodes by the gas pressure developed by gassing. By these expedients the portion of the electrode which projects from the electrolyte may be made exactly such as is needed for absorption and on the other hand there is a larger difference in the levels of the electrolyte when the battery is being charged and discharged or on open circuit.

We claim:

1. Electric battery, particularly secondary battery of alkaline type, comprising a stationary container, means for hermetically sealing the same during discharge and when on open circuit and for venting to the air when on charge, positive and negative electrodes and the electrolyte within said container, said container having a gas chamber above the electrolyte, a chemically active reducing body within said container made from a material adapted to be regenerated by electrolysis, said chemically active reducing body being located when the battery is on discharge and on open circuit with a substantial part of its surface outside said electrolyte and within said gas chamber, means operative by aerodynamic forces produced when the battery is being charged for causing the electrolyte to rise within said container so far that the said reducing body is submerged therein, and means for connecting the said reducing body to an outer source of electric energy.

2. Electric battery, particularly secondary battery of alkaline type, comprising a stationary container, means for hermetically sealing the same during discharge and when on open circuit and for venting to the air when on charge, positive and negative electrodes and the electrolyte within said container, said container having a gas chamber above the electrolyte, chemically active reducing and oxidizing bodies within said container made from materials adapted to be regenerated by electrolysis, said chemically active reducing and oxidizing bodies being located when the battery is on discharge and on open circuit, with a substantial part of their surfaces outside said electrolyte and within said gas chamber, means operative by aerodynamic forces produced when the battery is being charged for causing the electrolyte to rise within said container so far that the said reducing and oxidizing bodies are submerged therein, and means for connecting the said reducing and oxidizing bodies to an outer source of electric energy.

3. Electric battery as claimed in claim 1, in which the said means operative by aerodynamic forces consist of an upright tubular member enclosing said electrodes and adapted by the action of gas produced in the electrolyte to cause the electrolyte to rise within said tubular member, the said chemically active reducing body being located in position for being submerged in the electrolyte rising within said tubular member.

4. Electric battery as claimed in claim 2, in which the said means operative by aerodynamic forces consist of an upright tubular member enclosing said electrodes and adapted by the action of gas produced in the electrolyte to cause the electrolyte to rise within said tubular member, the said chemically active reducing and oxidizing bodies being located in position for being submerged in the electrolyte rising within said tubular member.

5. Electric battery as claimed in claim 1, in which the said means operative by aerodynamic forces consist of an expansion chamber in connection with the chamber containing the electrolyte and adapted upon an increase of the pressure within the container to take therefrom a part of the electrolyte and upon the subsequent venting of the container to return the electrolyte into the same.

6. Electric battery as claimed in claim 2, in which the said means operative by aerodynamic forces consist of an expansion chamber in connection with the chamber containing the electrolyte and adapted upon an increase of the pressure within the container to take therefrom a part of the electrolyte and upon the subsequent venting of the container to return the electrolyte into the same.

7. Electric battery as claimed in claim 1, in which the said means operative by aerodynamic forces consist of a closed expansion chamber communicating with the chamber containing the electrolyte through a passage of small area and adapted upon an increase of the pressure within the container to take therefrom a part of the electrolyte and upon the subsequent venting of the container to return the electrolyte into the same.

8. Electric battery as claimed in claim 1, in which the said means operative by aerodynamic forces consist of a closed expansion chamber communicating with the said chamber containing the electrolyte and means tending to compress said expansion chamber.

9. Electric battery as claimed in claim 1, in which the said means operative by aerodynamic forces consist of a closed expansion chamber communicating with the said chamber containing the electrolyte and containing compressible and expansible material.

10. A secondary battery of alkaline type, comprising a chamber adapted to contain an electrolyte with an hermetically tight gas space within the chamber and above the electrolyte, two electrodes arranged within the chamber, one rising to greater height within the chamber than the other, the electrode of greater height being of a material susceptible to reaction with a gas evolved in battery operation and accumulating in said gas space, and means for permitting the outflow from and inflow to the chamber of a body of electrolyte, in accordance with change in pressure of gas in said gas space, means for venting the said chamber when the battery is on charge, whereby the electrode of greater height may as the battery is alternately charged and discharged be alternately submerged in and rendered emergent from the electrolyte and into the gas space.

11. The method herein described of removing evolved gas from the chamber of a secondary battery of alkaline type which consists in effecting the charging of the battery while the electrodes are submerged in the electrolyte, and effecting, under pressure changes incident to the establishment of open circuit and of discharging conditions, a recession of the electrolyte and emergence of an electrode surface with consequent chemical reaction between evolved gas and the substance of the electrode over surfaces so exposed.

12. In the operation of a secondary battery of alkaline type, the method herein described of augmenting the rate of consumption of evolved gas by reaction with the substance of an electrode which consists in effecting the charging of the battery while the electrolyte is subject to atmospheric pressure, and effecting, under the augmented pressure of the accumulation of such gas when the battery is on open circuit and when on discharge the recession of the electrolyte and the emergence of an electrode surface, attended by reaction of such gas and the substance of the electrode over the surface so exposed.

A. ERICH LANGE.
ERICH LANGGUTH.
ADOLF DASSLER.
EDMUND BREUNING.